(12) United States Patent
Fujita et al.

(10) Patent No.: US 6,563,637 B2
(45) Date of Patent: May 13, 2003

(54) LENTICULAR LENS SHEET, REAR PROJECTION TYPE SCREEN, AND METHOD OF MANUFACTURING LENTICULAR LENS SHEET

(75) Inventors: Katsuhiro Fujita, Kitakanbara-gun (JP); Osamu Shinji, Kitakanbara-gun (JP)

(73) Assignee: Kuraray Co., Ltd., Kurashiki (JP)

( * ) Notice: Subject to any disclaimer, the term of this patent is extended or adjusted under 35 U.S.C. 154(b) by 0 days.

(21) Appl. No.: 10/025,594

(22) Filed: Dec. 26, 2001

(65) Prior Publication Data

US 2002/0085277 A1 Jul. 4, 2002

(30) Foreign Application Priority Data

Dec. 28, 2000 (JP) ........................................ 2000-400019

(51) Int. Cl.[7] .............................................. G03B 21/60
(52) U.S. Cl. ...................................................... 359/456
(58) Field of Search ................................. 359/455, 456, 359/457, 619

(56) References Cited

U.S. PATENT DOCUMENTS 5,745,288 A * 4/1998 Miyata et al. ............... 359/457

* cited by examiner

*Primary Examiner*—Christopher Mahoney
(74) *Attorney, Agent, or Firm*—Oblon, Spivak, McClelland, Maier & Neustadt, P.C.

(57) ABSTRACT

A lenticular lens sheet that is bonded to a front faceplate and used in a rear projection type screen is disclosed. The lenticular lens sheet has a plurality of lenticular lenses arranged on one surface of a light-transmitting substrate, and projecting non-convergence parts arranged on the other surface of the light-transmitting substrate in positions different to positions of convergence of light from the lenticular lenses. An external light absorbing layer that absorbs external light is provided on a summit portion of each of the projecting non-convergence parts. Also, the lenticular lens sheet and the front faceplate are bonded together at the summit portions of the projecting non-convergence parts using an adhesive, and the width of adhesive layers formed through curing of the adhesive is less than the width of the external light absorbing layers. Consequently, the adverse effects caused by blockage of light are prevented.

12 Claims, 6 Drawing Sheets

(a)

(b)

(c)

| Lens pitch | BS printing width | Width of adhesive layer | Maxmum thickness of adhesive layer | Adhesion width |
|---|---|---|---|---|
| 0.52 mm | 0.23 mm | 0.14 mm | 0.005~0.01 mm | 0.20 mm |
| 0.72 mm | 0.33 mm | 0.20 mm | 0.005~0.01 mm | 0.28 mm |

Fig.8

LENTICULAR LENS SHEET, REAR PROJECTION TYPE SCREEN, AND METHOD OF MANUFACTURING LENTICULAR LENS SHEET

BACKGROUND OF THE INVENTION

1. Field of the Invention

The present invention relates to a lenticular lens sheet and a rear projection type screen used in a rear projection television or the like, and a method of manufacturing the lenticular lens sheet.

2. Description of the Prior Art

A rear projection type screen used in a rear projection television or the like generally has a composition in which two lens sheets are placed on top of one another. Specifically, a Fresnel lens sheet that narrows image light from a CRT (cathode ray tube) or image light that has passed through liquid crystals so as to make the image light be within a certain angular range is placed on the light source side, and a lenticular lens sheet that has a function of spreading out the image light that has passed through the Fresnel lens sheet into a suitable angular range is placed on the observer side.

A schematic perspective view of a rear projection type screen is shown in FIG. 7. As shown in FIG. 7, the rear projection type screen is basically composed of a lenticular lens sheet 1 and a Fresnel lens sheet 3. Lenticular lenses 11 are formed on the surface of the lenticular lens sheet 1 from which the image light enters (hereinafter referred to as the 'light-entering surface'). Of the surface of the lenticular lens sheet 1 from which the image light exits (hereinafter referred to as the 'light-exiting surface'), convergence parts 12 where light from the lenticular lenses 11 formed on the light-entering surface of the lenticular lens sheet 1 is converged are generally formed in convex lens shapes. The reason that the convergence parts 12 are formed in convex lens shapes is to improve the image light diffusion capability in the horizontal direction. Moreover, in the case of a lenticular lens sheet 1 used in combination with a 3-tube type CRT light source, it is necessary to form the convergence parts 12 in convex lens shapes in order to correct for color shift between the three colors. Non-convergence parts 13 where light from the lenticular lenses 11 formed on the light-entering surface of the lenticular lens sheet 1 does not converge (i.e. parts other than the convergence parts 12) are made to have a projecting shape with a summit portion thereof parallel to the lenticular lens sheet 1. An external light absorbing layer comprising a black coating or the like is provided on the summit portion of each projecting part by roll coating, screen printing, transfer printing or the like, thus forming external light absorbing parts 130. As a result, of external light entering the lenticular lens sheet 1, the amount of light that is reflected at the light-exiting surface of the lenticular lens sheet 1 and returns to the observer side is reduced, and hence the image contrast is improved.

A lenticular lens sheet 1 having a synthetic resin material such as an acrylic as a base material has minute undulations on the observer side, resulting in a feeling of the image being coarse and in there being no feeling of high quality, and hence to improve this situation, in recent years it has become common to provide a front faceplate 2 comprising an acrylic plate or the like on the observer side. Such a front faceplate 2 may also be referred to as a light-transmitting sheet, a protective shield or a contrast filter. However, providing a front faceplate 2 results in problems such as a reduction in productivity due to an increase in the number of components, and a reduction in contrast due to an increase in the number of surfaces that reflect external light. To resolve these problems, in Japanese Patent Application Laid-open No. H06-308615, Japanese Patent Application Laid-open No. H07-307912 and Japanese Patent Application Laid-open No. H08-22077, methods have been proposed in which the front faceplate is bonded to the lenticular lens sheet at external light absorbing parts of the lenticular lens sheet to form a single body.

Specifically, Japanese Patent Application Laid-open No. H06-308615 discloses a method in which black stripes, i.e. external light absorbing layers, are formed in advance on projecting parts, and then black adhesive layers are provided and bonding is carried out to form a single body. Moreover, Japanese Patent Application Laid-open No. H07-307912 discloses a method in which external light absorbing layers are formed, and are themselves used as adhesive layers. Furthermore, Japanese Patent Application Laid-open No. H08-22077 discloses a method in which external light absorbing layers are formed, and a film that is to be bonded on to form a single body is coated in advance with a transparent adhesive layer that becomes adhesive only under conditions such as application of heat and pressure or ultrasound, and then bonding is carried out, and a method in which fine carbon particles are dispersed into an adhesive to form a black adhesive, and this black adhesive is applied onto the external light absorbing layers to from adhesive layers.

However, in the case of the method disclosed in Japanese Patent Application Laid-open No. H06-308615, a two-liquid-type solvent-type adhesive is used, and hence there is a problem in that if the solvent is not completely evaporated, then blockage of light will occur due to the adhesive running out. This is because the speed of drying of the adhesive is greatly affected by the environment of the room, and hence is difficult to control. Moreover, another reason is that the adhesion width varies greatly with the extent of evaporation, and hence control is difficult. Furthermore, there is also a problem in that the lenticular lens sheet and the front faceplate may shift relative to one another between the two being bonded together and the adhesive hardening.

Moreover, in the case of the method disclosed in Japanese Patent Application Laid-open No. H07-307912, as well as the problem of blockage of light due to the adhesive running out, there is also a problem in that unevenness in the thickness of the external light absorbing layers occurs due to the summit portions of the projecting parts on the lenticular lens sheet not being completely flat, and hence a sufficient light blocking effect is not achieved in regions where an external light absorbing layer is too thin. This unevenness in the thickness may also be perceptible in terms of the external appearance, in which case there will be a reduction in the image quality.

Furthermore, in the case of the method disclosed in Japanese Patent Application Laid-open No. H08-22077, the front faceplate must be thick, and hence a method such as thermocompression bonding cannot be adopted. Moreover, in the case of a transparent adhesive layer, there is a problem in that external light from the front faceplate side that is incident upon the interface between the edge of the transparent adhesive layer and the air is reflected at this interface, resulting in an increase in reflection of external light and hence a worsening of the contrast.

As described above, there are thus problems with the conventional art such as blockage of light caused by the adhesive used to bond the lenticular lens sheet and the front faceplate together.

SUMMARY OF THE INVENTION

In view of the foregoing, it is an object of the present invention to provide a lenticular lens sheet and a rear projection type screen, for which adverse effects caused by blockage of light are prevented.

It is another object of the present invention to provide a lenticular lens sheet manufacturing method, for which adverse effects caused by blockage of light are prevented.

According to one aspect of the present invention, for achieving the above-mentioned object, there is provided a lenticular lens sheet that is bonded to a front faceplate and used in a rear projection type screen, the lenticular lens sheet having a plurality of lenticular lenses arranged on one surface of a light-transmitting substrate, and projecting non-convergence parts arranged on the other surface of the light-transmitting substrate in positions different to positions of convergence of light from the lenticular lenses, wherein an external light absorbing layer that absorbs external light is provided on a summit portion of each of the projecting non-convergence parts, and wherein the lenticular lens sheet and the front faceplate are bonded together at the summit portions of the projecting non-convergence parts using an adhesive, and the width of adhesive layers formed through curing of the adhesive is less than the width of the external light absorbing layers.

Consequently, the adverse effects caused by blockage of light are prevented.

According to another aspect of the present invention, there is provided a method of manufacturing a front-faceplate-equipped lenticular lens sheet that is used in a rear projection type screen, has a front faceplate bonded thereto, and has a plurality of lenticular lenses arranged on one surface of a light-transmitting substrate, and projecting non-convergence parts arranged on the other surface of the light-transmitting substrate in positions different to positions of convergence of light from the lenticular lenses, the method comprising the steps of providing an external light absorbing layer that absorbs external light on a summit portion of each of the projecting non-convergence parts and bonding the lenticular lens sheet and the front faceplate together using an adhesive at the summit portions of the projecting non-convergence parts, and then curing the adhesive, such that the width of adhesive layers thus formed is less than the width of the external light absorbing layers.

Consequently, the adverse effects caused by blockage of light are prevented.

The above and further objects and novel features of the invention will more fully appear from the following detailed description when the same is read in connection with the accompanying drawings. It is to be expressly understood, however, that the drawings are for purpose of illustration only and are not intended as a definition of the limits of the invention.

BRIEF DESCRIPTION OF THE DRAWINGS

FIG. 8 is a table which shows the BS printing width, the width of application of the adhesive layers, the maximum thickness of application of the adhesive layers, and the adhesion width of an example.

DESCRIPTION OF THE PREFERRED EMBODIMENTS

Figure 1:
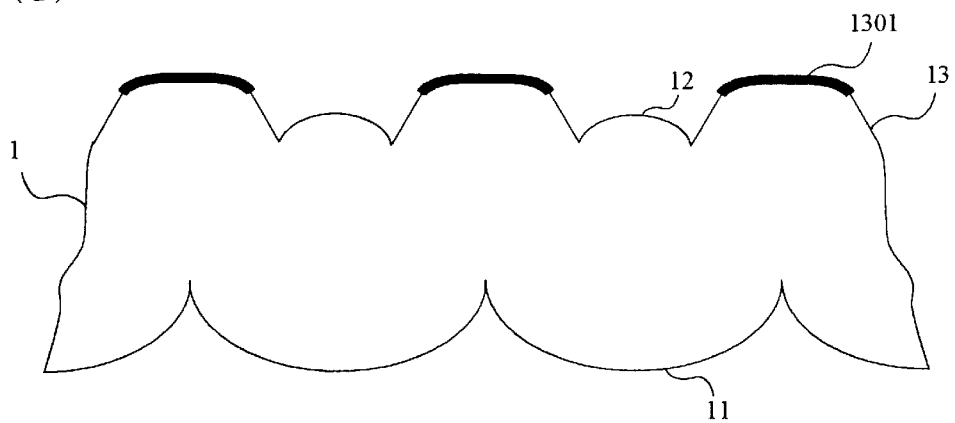
FIGS. 1(a), (b) and (c) are sectional views of the rear projection type screen according to the present invention.
Figure 1:
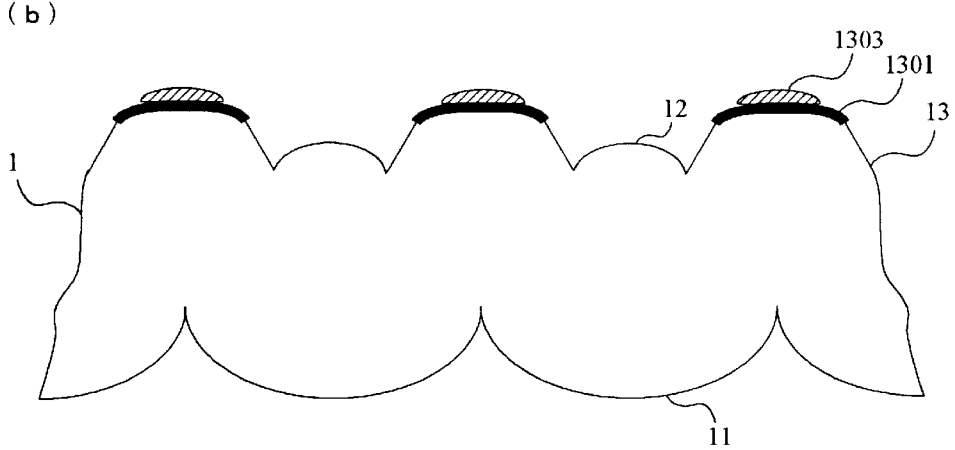
Figure 1:
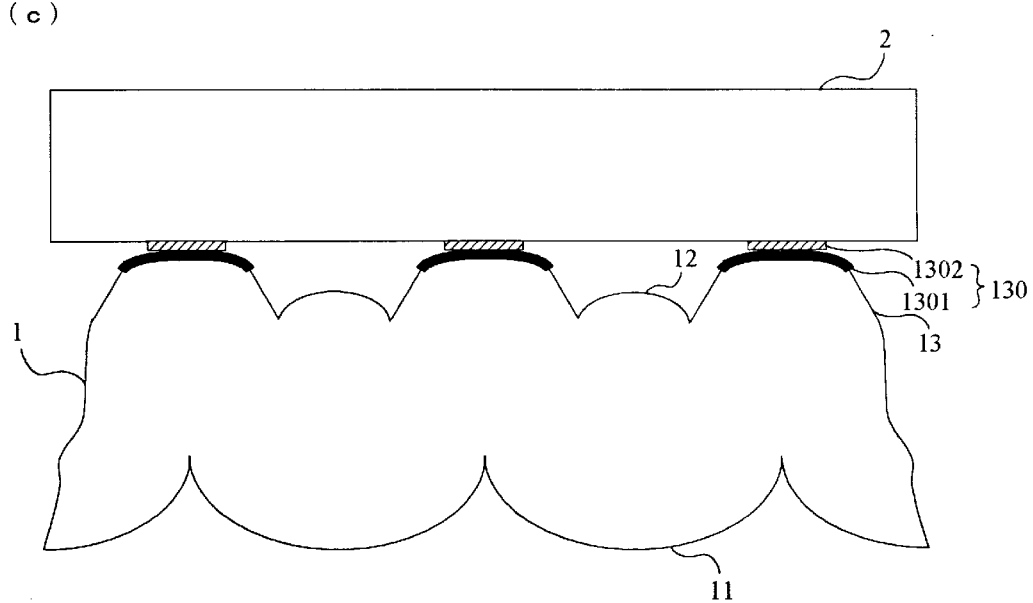
Figure 7:
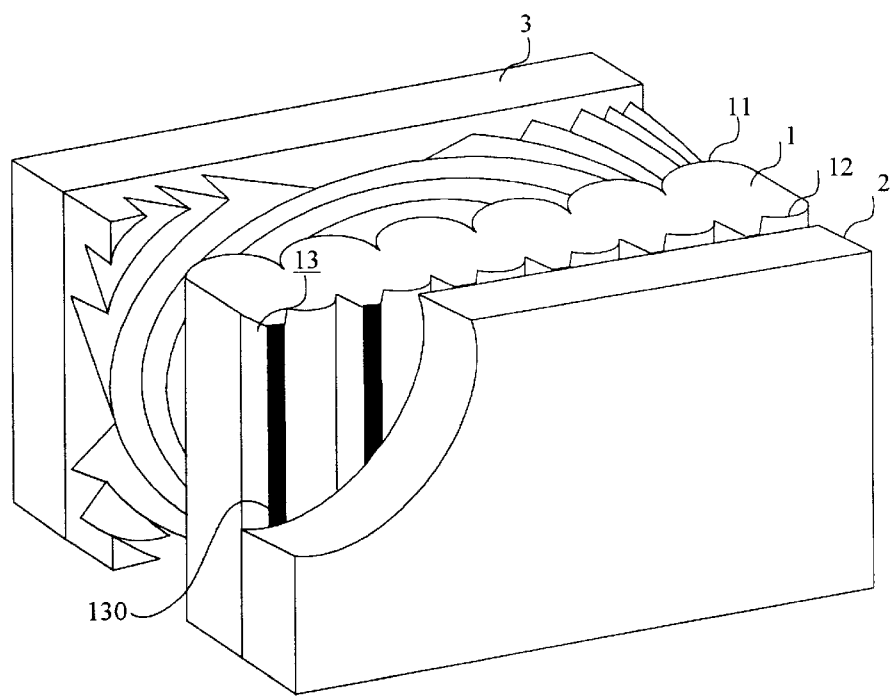
FIG. 7 shows a schematic perspective view of a rear projection type screen.

FIGS. 1(a), (b) and (c) are sectional views of the rear projection type screen according to the present invention. In FIGS. 1, only the lenticular lens sheet 1 and the front faceplate 2 are shown, but the rear projection type screen also has a Fresnel lens sheet 3 as in the case of the rear projection type screen shown in FIG. 7.

Lenticular lenses 11 are formed on the light-entering surface of the lenticular lens sheet 1. Out of the light-exiting surface of the lenticular lens sheet 1, convergence parts 12 are formed in positions where light from the lenticular lenses 11 formed on the light-entering surface converges. Non-convergence parts 13, which are formed on the light-exiting surface of the lenticular lens sheet 1 in positions where light from the lenticular lenses 11 formed on the light-entering surface does not converge, are each formed in a projecting shape with a summit portion thereof parallel to the lenticular lens sheet 1. An external light absorbing layer 1301 is provided on the summit portion of each projecting part, thus forming external light absorbing parts 130.

The lenticular lens sheet 1 is composed of, for example, an acrylic resin, a polycarbonate resin, an MS (methyl methacrylate/styrenecopolymer) resin, a polystyrene resin, a PET (polyethylene terephthalate) resin or the like, which may further contain a diffusing agent and/or a tinting agent.

The lenticular lens sheet 1 and the front faceplate 2 are bonded together at the non-convergence parts 13 using an adhesive. This adhesive is preferably an ultraviolet ray curing type adhesive, although it is also possible to use a solvent drying type adhesive, a thermosetting adhesive, an electron beam curing type adhesive or the like. If an ultraviolet ray curing type adhesive is used, then the adhesive can be cured immediately after the lenticular lens sheet 1 and the front faceplate 2 have been stuck together, and hence there is no need to move the resulting bonded article as in the case of passing the bonded article through a drying channel in the case that a thermosetting adhesive is used, and thus the chance of the lenticular lens sheet 1 and the front faceplate 2 shifting relative to one another is low. Moreover, the adhesive may be a transparent adhesive, although it is preferable to use a light-absorbing black ink or black adhesive so that the contrast will not worsen.

The front faceplate 2 is composed of, for example, an acrylic resin, a polycarbonate resin, an MS (methyl methacrylate/styrene copolymer) resin, a polystyrene resin, a PET resin or the like, and it is preferable for the surface thereof to be subjected to treatment such as hard coating treatment, antistatic treatment and antireflection treatment. Moreover, the front faceplate 2 may contain a diffusing agent, a tinting agent or the like either inside or on the surface thereof.

Figure 2:
FIG. 2 shows an enlarged view the rear projection type screen according to the present invention.

FIG. 1(a) shows the state after an external light absorbing layer 1301, i.e. a black stripe layer, has been applied onto the summit portion of each non-convergence part 13 of the lenticular lens sheet 1. As shown in the enlarged view of FIG. 2, the summit portion of each non-convergence part 13 of the lenticular lens sheet 1 is not flat, but rather has a convex shape in which the central part is higher than the edges. Such a shape can be produced through extrusion molding of the lenticular lens sheet 1. Because the summit portion of each non-convergence part 13 is made to have such a convex shape, after the adhesive has been applied, even when the front faceplate 2 is pushed against the summit portions of the non-convergence parts 13 of the lenticular lens sheet 1, by controlling the amount of the adhesive, the adhesive can be prevented from running out beyond the external light absorbing layers 1301. An external light absorbing layer 1301 is applied onto each convex-shaped summit portion, with the external light absorbing layer 1301 extending part way down the side surfaces of the non-convergence part 13 at the edges of the summit portion.

FIG. 1(b) shows the state after a black adhesive 1303 has been applied onto the upper surface of the external light absorbing layer 1301 on the summit portion of each non-convergence part 13 of the lenticular lens sheet 1. To prevent light being blocked by the adhesive, the adhesive 1303 is spread thinly to a narrow width less than the width of the external light absorbing layer 1301. The shape of the lenses has an effect, but it has been found from the results of various experiments that it is preferable for the adhesive 1303 to be applied in an amount such that, after the adhesive 1303 has been cured to produce adhesive layers 1302, the width of the adhesive layers 1302 is greater than 70% but less than 90% of the width of the external light absorbing layers 1301. Moreover, it is preferable for the thickness of the adhesive layers 1302 to be no more than 10 μm. Furthermore, by making the adhesive layers 1302 be black adhesive layers, a reduction in the contrast can be prevented.

FIG. 1(c) shows the state after the lenticular lens sheet 1 and the front faceplate 2 have been bonded together through the adhesive layers 1302. The lenticular lens sheet 1 and the front faceplate 2 are pushed together using bonding nip rollers. As described above, the amount of the adhesive 1303 applied is controlled, and moreover the summit portion of each non-convergence part 13 of the lenticular lens sheet 1 is convex in shape, and hence by setting the pushing force of the bonding nip rollers so as not to be excessively high, the adhesive layers 1302 can be prevented from being spread out beyond the width of the external light absorbing layers 1301, and hence blockage of light by the adhesive layers 1302 does not occur. Moreover, the glass transition temperature $T_g$ of the cured adhesive layers is preferably about 20 to 60° C., and is preferably lower than the glass transition temperature $T_g$ of the material (s) used for the front faceplate and the lenticular lens sheet. As a result, even if the bonded article is subjected to various shocks after the adhesive has been cured, peeling apart due to the shocks will not be prone to occur.

A detailed description will now be given of a method of manufacturing the lenticular lens sheet and rear projection type screen according to the present invention with reference to FIG. 3.

Figure 3:
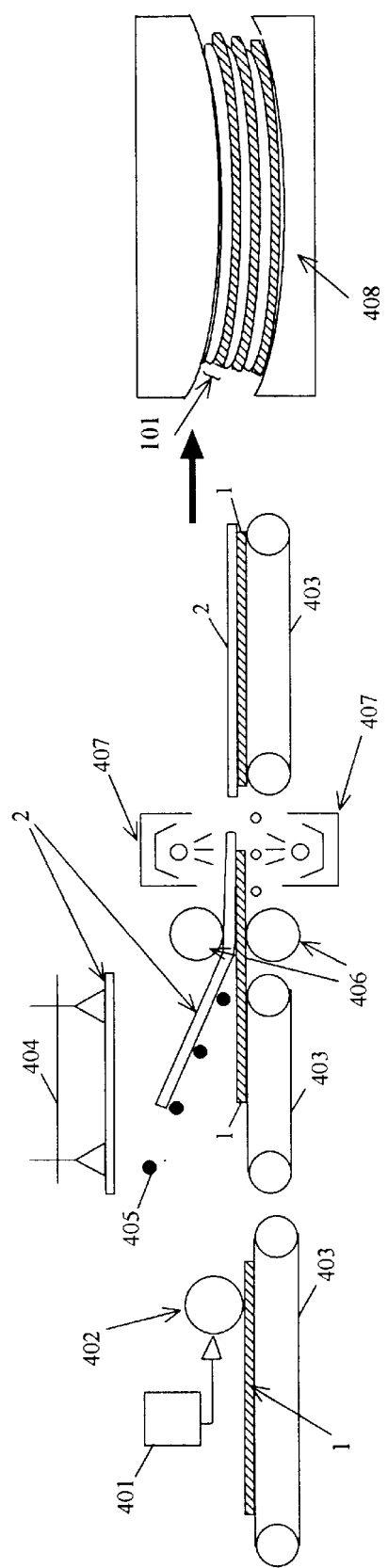
FIG. 3 shows one example of a method of manufacturing the lenticular lens sheet and rear projection type screen according to the present invention.

Firstly, the lenticular lens sheet 1 is placed on conveyance means 403 composed of conveying rollers, a conveyor belt or the like, and is conveyed to the right in FIG. 3. During the conveyance, an ultraviolet ray curing type adhesive is applied by an adhesive applying roller 402 onto the summit portions of the projecting non-convergence parts 13 provided on the light-exiting surface side of the lenticular lens sheet 1. The adhesive is supplied from adhesive supply means 401, with the supply being controlled such that a predetermined amount of adhesive is applied onto the summit portion of each non-convergence part 13, centered on the central part of the summit portion.

Next, the front faceplate 2, which is held by front faceplate holding means 404, is conveyed by conveying rollers 405 so as to come down onto the lenticular lens sheet 1 just before bonding nip rollers 406. The lenticular lens sheet 1 and the front faceplate 2, which are now on top of one another, are then conveyed between the bonding nip rollers 406. The lenticular lens sheet 1 and the front faceplate 2 passing between the bonding nip rollers 406 are further conveyed to the right in FIG. 3 due to the rotation of the bonding nip rollers 406. The positions of the upper and lower bonding nip rollers 406 are fixed, and hence the bonding nip rollers 406 apply a fixed pressure to the lenticular lens sheet 1 and the front faceplate 2 sandwiched therebetween. As a result, the lenticular lens sheet 1 and the front faceplate 2 are bonded together through the adhesive. If the amount of adhesive applied is controlled and the pressure applied by the nip rollers during the bonding is adjusted so as not to be excessively large, then the adhesion width can be controlled so as not to exceed a certain range. As a result, patches arising through the bonding can be prevented. Moreover, because black stripes, i.e. external light absorbing layers, are formed in advance, the occurrence of places where the light blocking effect is low due to the adhesive layer being too thin can be suppressed.

After passing between the bonding nip rollers 406, the lenticular lens sheet 1 and the front faceplate 2 are irradiated with ultraviolet rays by an ultraviolet ray irradiation device 407. This irradiation with ultraviolet rays cures the adhesive, thus permanently bonding the lenticular lens sheet 1 and the front faceplate 2 together. Note, however, that 'permanently bonding' here does not mean that there is absolutely no chance whatsoever of the lenticular lens sheet 1 and the front faceplate 2 peeling away from one another.

The bonded article comprising the lenticular lens sheet 1 and the front faceplate 2 is then subjected to a curvature-applying operation. In the curvature-applying operation, firstly a plurality of bonded articles 101 each comprising a lenticular lens sheet 1 and a front faceplate 2 are piled on top of one another and are placed onto a curving mold 408, with the front faceplate 2 of each bonded article 101 being at the top as shown in FIG. 3. The bonded articles 101 are then left for 1 hour in an oven at a temperature close to the thermal deformation temperature of the lenticular lens sheet 1 and the front faceplate 2, for example 60 to 100° C., thus completing the curvature-applying operation. Note that it is also possible to place only one bonded article 101 as opposed to a plurality of bonded articles 101 on the curving mold 408.

A description will now be given with reference to FIG. 4 of another manufacturing method different to the manufacturing method described above. In this manufacturing method, after passing between the bonding nip rollers 406, the lenticular lens sheet 1 and the front faceplate 2 are irradiated with ultraviolet rays by two ultraviolet ray irradiation devices 4071 and 4072.

Firstly, as in the manufacturing method described above, the lenticular lens sheet 1 is placed on the conveyance means

Figure 4:
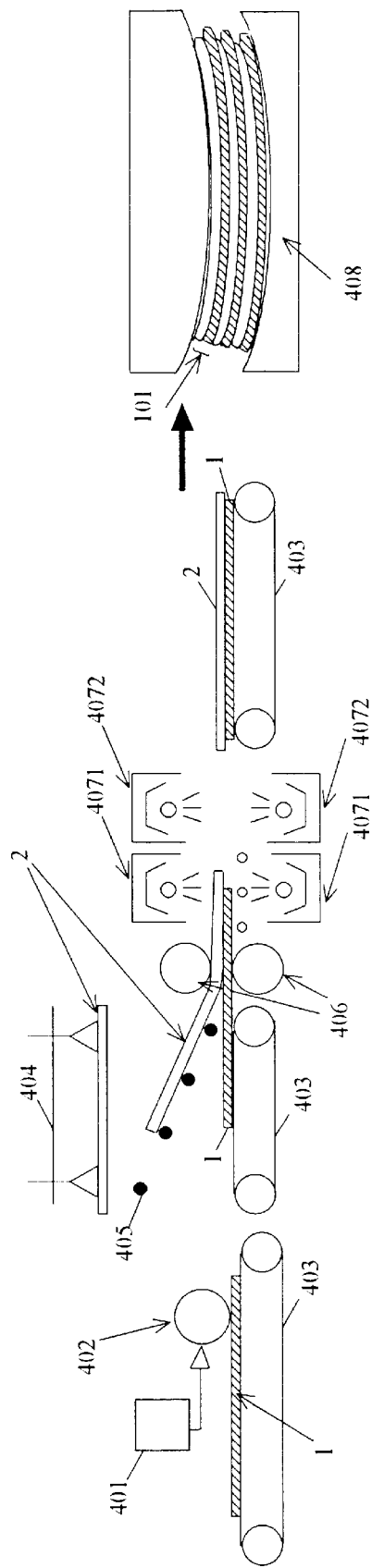
FIG. 4 shows the other example of a method of manufacturing the lenticular lens sheet and rear projection type screen according to the present invention.

403, is conveyed to the right in FIG. 4, and has an adhesive applied thereon. The front faceplate 2, which is held by the front faceplate holding means 404, is then conveyed by the conveying rollers 405 so as to come down onto the lenticular lens sheet 1 just before the bonding nip rollers 406, and the lenticular lens sheet 1 and the front faceplate 2 are conveyed between the bonding nip rollers 406.

After passing between the bonding nip rollers 406, the lenticular lens sheet 1 and the front faceplate 2 are irradiated with ultraviolet rays by the ultraviolet ray irradiation device 4071. This irradiation with ultraviolet rays by the ultraviolet ray irradiation device 4071 half cures the adhesive. The lenticular lens sheet 1 and the front faceplate 2 are then irradiated with ultraviolet rays by the ultraviolet ray irradiation device 4072, which has a higher energy output than the ultraviolet ray irradiation device 4071. This irradiation with ultraviolet rays by the ultraviolet ray irradiation device 4072 completes the curing of the adhesive, thus permanently bonding the lenticular lens sheet 1 and the front faceplate 2 together. The curvature-applying operation is then carried out as in FIG. 3.

A description will now be given with reference to FIG. 5 of another manufacturing method different to the manufacturing methods described above. In this manufacturing method, the lenticular lens sheet 1 is irradiated with ultraviolet rays by the ultraviolet ray irradiation device 4071 before passing between the bonding nip rollers 406, and the lenticular lens sheet 1 and the front faceplate 2 are irradiated with ultraviolet rays by the ultraviolet ray irradiation device 4072 after passing between the bonding nip rollers 406.

Figure 5:
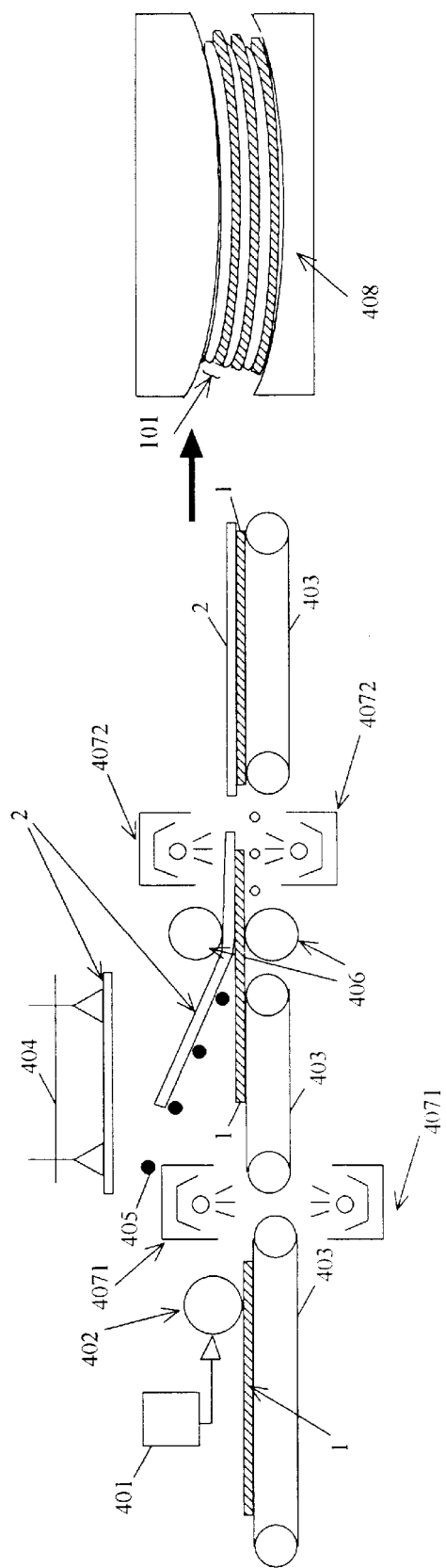
FIG. 5 shows the other example of a method of manufacturing the lenticular lens sheet and rear projection type screen according to the present invention.

Firstly, as in the manufacturing methods described above, the lenticular lens sheet 1 is placed on the conveyance means 403, is conveyed to the right in FIG. 5, and has an adhesive applied thereon. The lenticular lens sheet 1 is irradiated with ultraviolet rays by the ultraviolet ray irradiation device 4071 before passing between the bonding nip rollers 406. The irradiation with ultraviolet rays by the ultraviolet ray irradiation device 4071 half cures the adhesive. The front faceplate 2, which is held by the front faceplate holding means 404, is then conveyed by the conveying rollers 405 so as to come down onto the lenticular lens sheet 1 just before the bonding nip rollers 406.

The lenticular lens sheet 1 and the front faceplate 2 are next pushed together by the bonding nip rollers 406, and are then irradiated with ultraviolet rays by the ultraviolet ray irradiation device 4072, which has a higher energy output than the ultraviolet ray irradiation device 4071. This irradiation with ultraviolet rays by the ultraviolet ray irradiation device 4072 completes the curing of the adhesive, thus permanently bonding the lenticular lens sheet 1 and the front faceplate 2 together. The curvature-applying operation is then carried out as in FIG. 3.

Note that in the case of a lenticular lens sheet 1 of an LCD type rear projection type screen, it is not necessary to provide lens parts on the light-exiting surface side, but rather these parts can be made flat. The present invention can also be applied to a lenticular lens sheet 1 having such a structure.

WORKING EXAMPLES

The present invention will now be described in detail through working examples. In these working examples, two types of a 1 mm-thick, 50-inch-size (height 790 mm) acrylic lenticular lens sheet, having lens pitches of 0.52 mm and 0.72 mm respectively, were used. After applying black stripes and an ultraviolet curing type black adhesive onto the projecting parts of the lenticular lens sheet, a 2 mm-thick acrylic front faceplate was pressed onto the upper surface of the lenticular lens sheet using nip rollers. Immediately afterwards, irradiation with ultraviolet rays was carried out, thus bonding the lenticular lens sheet and the front faceplate together. In the present working examples, a black acrylic ink of $T_g$ about 40° C. was used for the adhesive layers, and a black urethane ink of $T_g$ about 50° C. was used for the external light absorbing layers. Moreover, an acrylic of $T_g$ about 120° C. was used for both the front faceplate and the lenticular lens sheet.

Figure 6:
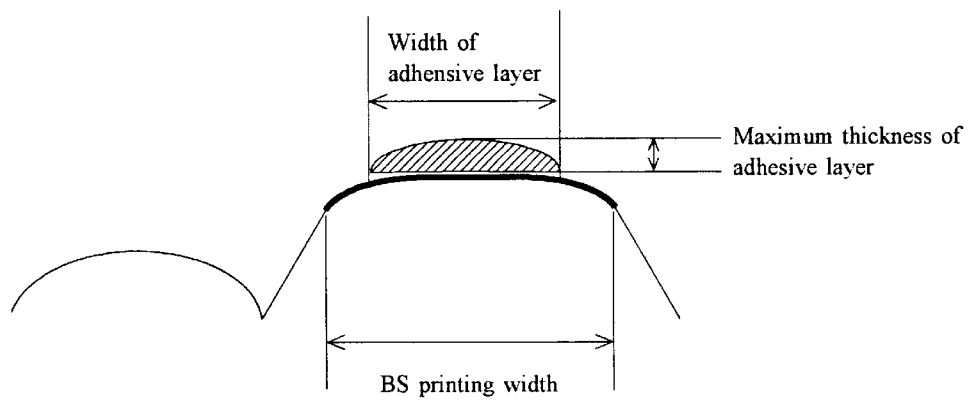
FIG. 6 is an explanation diagram to show positions of the length of the portion.

The BS printing width (the width of the external light absorbing layers), the width of application of the adhesive layers, the maximum thickness of application of the adhesive layers, and the adhesion width are shown in the table in FIG. 8 for the cases of the two lens pitches 0.52 mm and 0.72 mm in the present working examples. Here, each position of the length is shown in FIG. 6.

As can be seen from the table in FIG. 8, the adhesion width is narrower than the BS printing width, and hence blockage of light due to running out of the adhesive did not occur.

According to the present invention, a lenticular lens sheet, a rear projection type screen, and a lenticular lens sheet manufacturing method, for which adverse effects caused by blockage of light are prevented, can be provided.

While preferred embodiments of the present invention have been described using specific terms, such description is for illustrative purposes only, and it is to be understood that changes and variations may be made without departing from the spirit or scope of the following claims.

What is claimed is:

1. A lenticular lens sheet that is bonded to a front faceplate and used in a rear projection type screen, the lenticular lens sheet having:
    a plurality of lenticular lenses arranged on one surface of a light-transmitting substrate; and
    projecting non-convergence parts arranged on the other surface of the light-transmitting substrate in positions different to positions of convergence of light from said lenticular lenses;
    wherein an external light absorbing layer that absorbs external light is provided on a summit portion of each of said projecting non-convergence parts,
    and wherein said lenticular lens sheet and said front faceplate are bonded together at the summit portions of said projecting non-convergence parts using an adhesive, and the width of adhesive layers formed through curing of the adhesive is less than the width of the external light absorbing layers.

2. The lenticular lens sheet according to claim 1, wherein the summit portion of each of said projecting non-convergence parts has a convex shape in which a central part thereof is higher than edge parts thereof.

3. The lenticular lens sheet according to claim 1, wherein the width of said adhesive layers is more than 70% and less than 90% of the width of said external light absorbing layers, and the thickness of said adhesive layers is no more than 10 μm.

4. The lenticular lens sheet according to claim 1, wherein said adhesive is a black adhesive that absorbs external light.

5. The lenticular lens sheet according to claim 1, wherein said adhesive is an ultraviolet ray curing type adhesive.

6. The lenticular lens sheet according to claim 1, wherein the glass transition temperature of said adhesive after curing is lower than the glass transition temperature of a material used in said front faceplate and said lenticular lens sheet.

7. The lenticular lens sheet according to claim 1, wherein the lenticular lens sheet and the front faceplate are curved to project the center of the light-entering side of the front faceplate.

8. A rear projection type screen, comprising the lenticular lens sheet according to claims 1, 2, 3, 4, 5, 6 or 7, and a Fresnel lens sheet provided on a light-entering surface side of said lenticular lens sheet.

9. A method of manufacturing a front-faceplate-equipped lenticular lens sheet that is used in a rear projection type screen, has a front faceplate bonded thereto, and has a plurality of lenticular lenses arranged on one surface of a light-transmitting substrate, and projecting non-convergence parts arranged on the other surface of the light-transmitting substrate in positions different to positions of convergence of light from said lenticular lenses, the method comprising the steps of:

providing an external light absorbing layer that absorbs external light on a summit portion of each of said projecting non-convergence parts; and bonding said lenticular lens sheet and said front faceplate together using an adhesive at the summit portions of said projecting non-convergence parts, and then curing the adhesive, such that the width of adhesive layers thus formed is less than the width of the external light absorbing layers.

10. The method of manufacturing a lenticular lens sheet according to claim 9, wherein the width of said adhesive layers is more than 70% and less than 90% of the width of said external light absorbing layers, and the thickness of said adhesive layers is no more than 10 $\mu$m.

11. The method of manufacturing a lenticular lens sheet according to claim 9, wherein the step of curing said adhesive comprises a step of half-curing the adhesive before pressing using nip rollers, and a step of curing the adhesive after pressing using the nip rollers.

12. The method of manufacturing a lenticular lens sheet according to claim 9, further comprising a step for applying a curvature on the lenticular lens sheet and the front faceplate.

\* \* \* \* \*